United States Patent [19]

Zimmermann et al.

[11] 4,426,241

[45] Jan. 17, 1984

[54] BELT LOOP FABRICATING APPARATUS AND METHOD

[75] Inventors: Hubert Zimmermann, Aachen; Thomas Kempf, Wuppertal, both of Fed. Rep. of Germany

[73] Assignee: Otto Brand GmbH, Wuppertal, Fed. Rep. of Germany

[21] Appl. No.: 409,075

[22] Filed: Aug. 18, 1982

[30] Foreign Application Priority Data

Aug. 20, 1981 [DE] Fed. Rep. of Germany ....... 3132862

[51] Int. Cl.³ .............................................. B31F 1/00
[52] U.S. Cl. .................................... 156/217; 156/226; 156/443; 156/468; 156/475
[58] Field of Search ............... 156/475, 468, 217, 226, 156/228, 443, 73.1; 100/25, 26; 112/121.27

[56] References Cited

U.S. PATENT DOCUMENTS 4,244,773  1/1981  Siebeck ............................ 100/26 X
4,366,764  1/1983  McCurry ....................... 112/121.27

Primary Examiner—David A. Simmons

[57] ABSTRACT

Fabric loops, intended for attachment to articles of clothing for example, are fabricated from a tape the free end of which is sequentially formed into a loops which are permanently closed. To form the loops, a continuous tape is delivered into a track which doubles back on itself whereby the advancing free tape end will overlap a portion of the tape, and the tape will subsequently be cut and the overlapping portions bonded together to complete a loop.

17 Claims, 5 Drawing Figures

BELT LOOP FABRICATING APPARATUS AND METHOD

BACKGROUND OF THE INVENTION

(1) Field of the Invention

The present invention relates to the production of textile articles and particularly to the formation of loops from fabric material. More specifically, this invention is directed apparatus for use in the automated fabrication of hanging loops, belt loops for example, for subsequent attachment to articles of clothing and the like. Accordingly, the general objects of the present invention are to provide novel and improved method and apparatus of such character.

(2) Description of the Prior Art

Hanging loops, for example belt loops which are sewn into coats, are commonly produced from a tape of textile loop fabric. It has previously been common practice in the garment industry to fabricate such loops during the manufacture of the article of clothing to which the loop was to be attached. The fabrication procedure consisted of cutting a length of fabric from the tape, manually bending the severed section of the tape into a loop and then stitching the loop closed. This prior hanging loop forming process is time-consuming, labor intensive and, accordingly, expensive.

SUMMARY OF THE INVENTION

The present invention overcomes the above-briefly discussed and other deficiencies and disadvantages of the prior art by providing apparatus for the automatic production of hanging loops comprised of fabric material and a loop forming method commensurate with the operation of this apparatus. Practice of the present invention results in the prefabrication of hanging loops in an inexpensive and uncomplicated manner, such loops thus being available for subsequent attachment to garments and the like.

In accordance with the present invention the end of a tape comprised of fabric material is drawn into a loop, the overlapping portions thereof bonded together, the loop severed from the remainder of the tape and the completed loop then ejected from the apparatus. In a preferred embodiment the bonding is accomplished ultrasonically. Also in accordance with a preferred embodiment, the ejection is achieved using compressed air.

Apparatus in accordance with the present invention employs a cyclically operated conveyor mechanism for feeding the end of the tape into a loop-shaped groove with the severing device operating in a space between the end of the conveyor and the entrance end of the groove.

BRIEF DESCRIPTION OF THE DRAWING

The present invention may be better understood and its numerous objects and advantages will become apparent to those skilled in the art by reference to the accompanying drawing wherein like reference numerals refer to like elements in the several FIGURES and in which.

DESCRIPTION OF THE DISCLOSED EMBODIMENT

Figure 1:
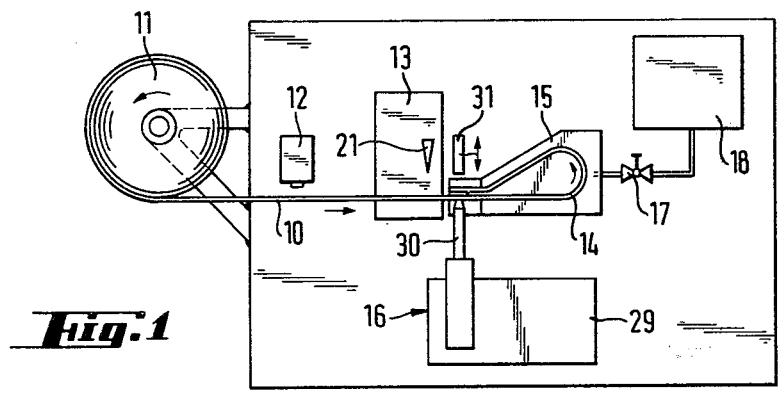
FIG. 1 is a schematic illustration of apparatus in accordance with the present invention.
Figure 4:
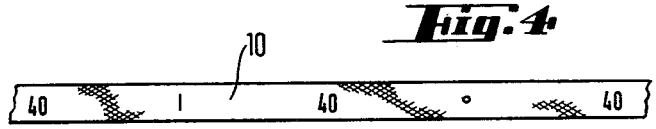
FIG. 4 is a top view of a portion of a tape which is received in the apparatus of FIGS. 1–3.

With reference now to the drawing, and particularly FIG. 1, a fabric tape 10 from which loops are to be formed is withdrawn from a supply reel 11 and fed into a cyclically operating conveying mechanism. The feeding of the tape into the loop forming machine is caused by an adjustable tape advance mechanism, not shown, which operates under the control of microswitches. If the tape 10 is provided with suitable markings, for example as indicated in FIG. 4, the loop forming machine may be provided with a photo-electric sensing device 12 which generates control signals for the cut-off and fusing devices which will be described below. The cut-off device is indicated at 13 and may, for example, comprise a heated blade. The cut-off device, when actuated, will sever the tape to produce lengths suitable for formation of loops of the desired size, the tape being cut at the appropriate points in relation to the pattern repeat of the fabric. In the absence of markings on the tape which may be machine read, the cyclical advance of the tape 10 may be controlled mechanically.

The end of the tape 10 is inserted into a loop-shaped groove or slot 14 in a matrix 15. The tape end, following the groove 14, will be caused to double back on itself so that there will be a portion where the end of the tape is in overlapping relationship to an upstream portion thereof. The fabric is then fused together, for example by means of an ultrasonic bonding device which is indicated generally at 16, in the region of overlap which the loop thus formed is being severed from the remainder of the tape. The finished loop is then ejected from groove 14.

Figure 2:
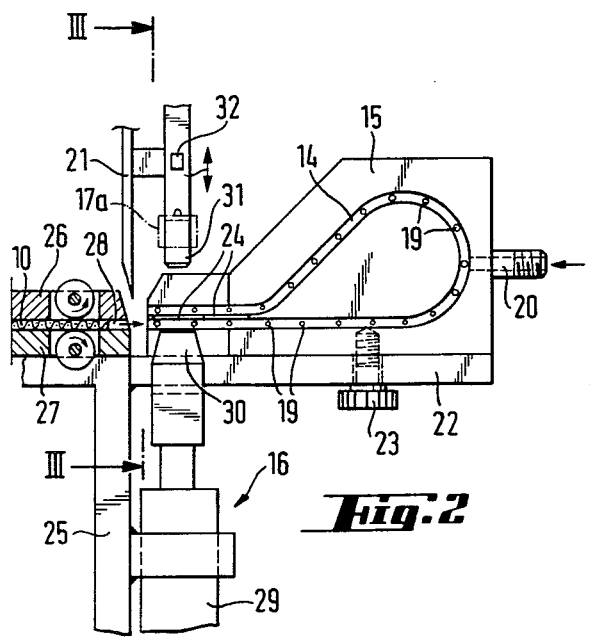
FIG. 2 is a side-elevation view, partly in section, of the apparatus depicted schematically in FIG. 1.

In the disclosed embodiment of the invention the ejection of the finished loop from groove 4 is accomplished by means of compressed air. Thus, in the disclosed embodiment the matrix 15 is provided with an internal cavity which is connected to a compressed air source 18 by means of a conduit 17 provided with a control valve. The base of the groove 14 is provided with a plurality of ports 19 which communicate with the cavity in matrix 15. Referring to FIG. 2, a connector 20 will receive the conduit 17 and thus will connect the compressed air source 18 to the matrix cavity. The valve in conduit 17 will, in the manner to be described in greater detail below, be opened in response to the closing of a microswitch 17a (FIG. 3) at approximately the point in time when the blade 21 of the cut-off device 13 reaches the cut-off position. The microswitch will be opened, and thus the valve closed, when the blade leaves the cut-off position. Accordingly, a plurality of air jets will act upon the loop in groove 14, the jets being discharged through ports 19, immediately subsequent to the loop being severed from the tape. The air jets will eject the finished, cut-off loop from the groove. The depth of groove 14 will be selected such that it substantially corresponds to the width of the tape whereby the air jets will have the optimum effect.

It should be noted that, as an alternative to compressed air ejection, a mechanical ejection device which, for example, employs push rods may be utilized.

Continuing to consider FIG. 2, the matrix 15 is mounted on a support plate 22 by means of an attachment screw 23 and can therefore be readily replaced in the event that the size of the tape 10 or the dimensions of the loop to be fomred therefrom are to be changed. In order for the advancing free end of the tape, which is to be bonded to an upstream portion thereof in order to form the loop, to be positioned as closely as possible to the said upstream tape portion, a thin, spring steel separator insert 24 (FIG. 3) is provided in the entrance area of groove 14.

There is, as best seen from FIG. 2, a slight gap between entrance end of groove 14 and the conveyor mechanism for the tape. The conveyor mechanism, in the disclosed embodiment, comprises a pair of guide plates 26, 27 which define a slot 28 therebetween. The tape will be transmitted along slot 28 by, for example, friction wheels which have not been numbered on the drawing. The upper guide plate 26 is bevelled on the end which faces matrix 15 so as to have a shape which is complementary to the shape of the cutting blade 21.

Matrix 15 is reduced in width in the entrance area of groove 14 whereby the groove has, in the entrance area thereof, a depth equal to approximately half the width of tape 10. The tape is fused in this entrance area in the region which lies to the side of groove 14 by the ultrasonic bonding device 16. The bonding device 16 comprises an ultrasound generator 29, a sonotrode 30 which is attached to the machine frame 25, and an anvil 31. The anvil 31 will preferrably move upwardly and downwardly relative to sonotrode 30 and, in the preferred embodiment, is mechanically coupled to blade 21 so as to move therewith. When blade 21 is in its cut-off position, anvil 31 presses the layers of tape against the opposing surface of sonotrode 30 so that the fabric layers are fused together. The ultrasound generator 29 may be operated either continuously or intermittently. Either anvil 31 or blade 21 will typically be provided with an arm 32 which operates the microswitch 17a.

Figure 3:
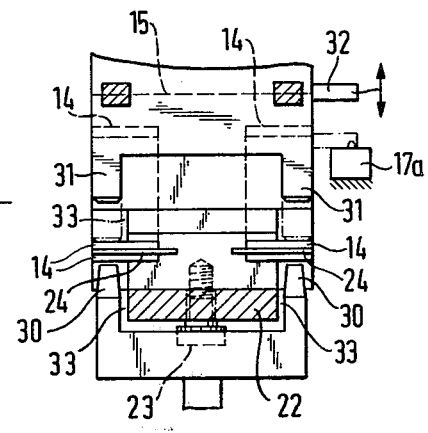
FIG. 3 comprises a front-elevation view taken along line III—III of FIG. 2.

In the disclosed embodiment of the invention, as may be seen from FIG. 3, the matrix 15 will be provided with a groove 14 on a pair of opposite sides thereof so that two loops may be produced simultaneously from fabric tape drawn from a pair of supply reels. Accordingly, the conveying track will be constructed with two channels 28 and the cutting and bonding apparatus will be constructed so as to cooperate with each tape. An air gap 33 is provided between sonotrode 30 and anvil 31 and matrix 15 in order to permit the ultrasonic bonding.

Figure 5:
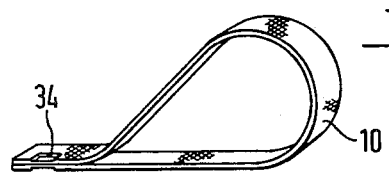
FIG. 5 is a perspective view of a finished loop formed from the tape of FIG. 4 in the apparatus of FIGS. 1–3.

FIG. 5 represents a hanging loop produced employing the apparatus of FIGS. 1–3 in accordance with the above-described technique. The loop of FIG. 5 is characterized by a bond area 34 which extends from one edge of the loop to approximately the mid-point of the overlapping tapes.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. A method for the fabrication of hanging loops from a tape comprised of fabric comprising the steps of:
   advancing the free end of the tape along a groove to define a loop, the groove being contoured to cause the free tape end to be doubled back on the remainder of the tape in a region in front of the point of entrance of the tape into the groove whereby said free end will be in adjacent overlapping relationship therewith and substantially parallel to the advancing direction of the tape;
   bonding the tape to itself in the region where it is overlapping to permanently close the loop;
   severing the bonded loop from the tape; and
   ejecting the severed loop from the groove.

2. The method of claim 1 wherein the tape is bonded by ultrasonically induced fusion.

3. The method of claim 1 wherein the tape is simultaneously bonded and severed.

4. The method of claim 2 wherein the tape is simultaneously bonded and severed.

5. Apparatus for forming permanently closed loops from textile fabric in tape form comprising:
   means defining a first open-sided loop-shaped groove;
   means for cyclically feeding the end of a tape into said groove, the groove causing the tape to form a loop with the end thereof overlapping another portion of the tape at the entrance end of the groove;
   means for severing the tape at a point upstream, in the direction of tape movement, of the said entrance end of the groove;
   means for bonding the tape to itself adjacent to and immediately downstream of the operational region of said severing means, said bonding means comprising an active element and an anvil, said anvil being movable toward and away from said active element; and
   means for ejecting a severed and bonded loop from said groove.

6. The apparatus of claim 5 wherein said groove has a depth which corresponds to the width of the tape along at least the major portion of its length and wherein said ejection means comprises:
   a plurality of gas discharge ports in the bottom of said groove;
   a source of compressed gas; and
   means responsive to each operation of said bonding means for coupling said gas source to said ports.

7. The apparatus of claim 5 wherein said groove has a maximum depth which is approximately half the width of said tape at the entrance end, said anvil and active element of said bonding means contacting the tape adjacent said groove entrance end.

8. The apparatus of claim 6 wherein said groove has a maximum depth which is approximately half the width of said tape at the entrance end, said anvil and active element of said bonding means contacting the tape adjacent said groove entrance end.

9. The apparatus of claim 5 further comprising:
   means defining a second open-sided loop-shaped groove;
   means for cyclically feeding the end of a tape into said second groove simultaneously with a tape being fed into said first groove, said second groove causing the tape to form a loop with the end thereof overlapping another portion of the tape at the entrance end of said second groove;
   means for severing the tape at a point immediately upstream, in the direction of tape movement, of the said entrance end of the second groove;
   means for bonding the tape into itself adjacent to and immediately downstream of the operational region of said severing means, said bonding means comprising an active element and an anvil, said anvil being movable toward and away from said active element; and means for ejecting a severed and bonded loop from said second groove.

10. The apparatus of claim 9 further comprising:
means for causing said anvils and severing means to move in synchronism.

11. The apparatus of claim 9 wherein each of said grooves have a depth which corresponds to the width of the tape along at least the major portion of its length and wherein said ejection means each comprises:
a plurality of gas discharge ports in the bottom of each of said grooves;
a source of compressed gas; and
means responsive to each operation of said bonding means for coupling said gas source to said ports.

12. The apparatus of claim 9 wherein each of said grooves have a maximum depth which is approximately half the width of said tape at the entrance end, said anvil and active element of said bonding means contacting the tape adjacent said groove entrance end.

13. The apparatus of claim 7 further comprising:
means separating said groove into upper and lower portions at the entrance end thereof, said separating means comprising a thin metallic insert.

14. The apparatus of claim 8 further comprising:
means separating said groove into upper and lower portions at the entrance end thereof, said separating means comprising a thin metallic insert.

15. The apparatus of claim 13 further comprising:
means separating each of said grooves into upper and lower portions at the entrance end thereof, said separating means comprising a thin metallic insert.

16. The apparatus of claim 9 wherein said grooves are formed in opposite sides of a matrix and wherein said bonding means anvils and active elements are positioned to opposite sides of said matrix.

17. The apparatus of claim 15 wherein said grooves are formed in opposite sides of a matrix and wherein said bonding means anvils and active elements are positioned to opposite sides of said matrix.

* * * * *